US008204205B1

(12) United States Patent
Blanchard et al.

(10) Patent No.: US 8,204,205 B1
(45) Date of Patent: Jun. 19, 2012

(54) METHOD FOR INCREASING THE EFFICIENCY OF AUTOMATED TELEPHONY SYSTEMS

(75) Inventors: Harry Blanchard, Rumson, NJ (US); Steven Lewis, Middletown, NJ (US); Gregory Pulz, Cranbury, NJ (US); Lan Zhang, Wayne, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1156 days.

(21) Appl. No.: 11/704,000

(22) Filed: Feb. 8, 2007

(51) Int. Cl.
*H04M 5/00* (2006.01)

(52) U.S. Cl. ......... 379/265.01; 379/265.02; 379/265.07; 379/266.01; 379/266.02; 379/266.03; 704/270; 704/251; 704/257; 704/275

(58) Field of Classification Search ............. 379/265.01, 379/265.02, 265.07, 266.01–266.04; 704/270, 704/270.01, 275, 251, 257
See application file for complete search history.

(56) References Cited

U.S. PATENT DOCUMENTS

| 5,444,774 | A | 8/1995 | Friedes | |
|---|---|---|---|---|
| 6,301,354 | B1 | 10/2001 | Walker et al. | |
| 6,314,178 | B1 | 11/2001 | Walker et al. | |
| 6,411,687 | B1 | 6/2002 | Bohacek et al. | |
| 6,584,180 | B2 | 6/2003 | Nemoto | |
| 6,735,300 | B2 | 5/2004 | Walker et al. | |
| 6,807,274 | B2* | 10/2004 | Joseph et al. | ............. 379/265.01 |
| 6,819,756 | B2 | 11/2004 | Stumer et al. | |
| 7,046,777 | B2* | 5/2006 | Colson et al. | ............ 379/142.06 |
| 7,085,367 | B1* | 8/2006 | Lang | ........................ 379/265.06 |
| 7,426,268 | B2 | 9/2008 | Walker et al. | |
| 7,436,948 | B1 | 10/2008 | Thenthiruperai | |
| 7,539,287 | B2* | 5/2009 | Hunter et al. | ................ 379/1.02 |
| 7,756,263 | B1* | 7/2010 | Thenthiruperai | ........ 379/265.07 |
| 2004/0017898 | A1* | 1/2004 | Reynolds | .................. 379/88.18 |
| 2004/0264677 | A1* | 12/2004 | Horvitz et al. | ........... 379/265.02 |
| 2005/0081152 | A1* | 4/2005 | Commarford et al. | ........ 715/705 |
| 2006/0115070 | A1* | 6/2006 | Bushey et al. | ........... 379/265.02 |
| 2007/0025528 | A1* | 2/2007 | Knott et al. | ................ 379/32.01 |
| 2007/0043571 | A1* | 2/2007 | Michelini et al. | .......... 704/270.1 |

OTHER PUBLICATIONS

Non-final Office Action for U.S. Appl. No. 11/703,932; First-named Inventor: Harry Blanchard; Confirmation No. 1407; Mailing Date: Oct. 1, 2010.

* cited by examiner

*Primary Examiner* — Joseph J Nguyen

(57) ABSTRACT

The problem of an automated telephony system having only a single way to measure a caller's difficulty in processing a transaction when using the system is solved by selecting from at least two thresholds for measuring the caller's difficulty. Having a choice of alternative thresholds to measure the caller's difficulty, referred to as inefficiency thresholds, allows for a more responsive approach to managing an automated telephony system. This choice of inefficiency thresholds overcomes multiple problems of systems only using one inefficiency threshold, such as: (1) transferring a call to a live agent to quickly, (2) transferring a call to a live agent to slowly, and (3) giving a caller a feeling that the automated telephony system is unresponsive to his or her needs. Having multiple inefficiency thresholds from which to choose allows for a more dynamic response to a diverse audience of callers and to different needs of a single caller during the various parts of a call.

8 Claims, 2 Drawing Sheets

METHOD FOR INCREASING THE EFFICIENCY OF AUTOMATED TELEPHONY SYSTEMS

This application is related to commonly assigned U.S. patent application Ser. No. 11/703,932 filed on Feb. 8, 2007, and entitled "Method for Optimizing the Processing of a Caller's Transaction Using an Automated System".

BACKGROUND OF THE INVENTION

The present invention relates generally to the field of telephony, and more particularly to increasing the efficiency of automated telephony systems.

In automated telephony systems (called herein automated systems) a problem sometimes arises when a caller is ineffective at using the automated system to process a transaction. (As used herein, the term "caller" includes a called party that may use an automated system or may be put in a queue.) Some examples of transactions that can be processed on an automated system are: a caller's inquiry, an order the caller wishes to place, a desired change to a caller's account, or a billing question, just to name a few possibilities. A common example of an automated system is an interactive voice response system (IVR). The IVR presents audible questions to a caller, and prompts the caller to respond in some way. Two examples of ways for a caller to respond to the prompts of an IVR system are: (1) by speaking in conjunction with an automated speech recognition (ASR) system, and (2) by using a telephone keypad response system. (The term "telephone keypad" as used herein refers to any device which is contacted to transmit a response.) Using an ASR system, the caller responds by verbalizing his or her answer. Using a telephone keypad response system, the caller responds by pressing a number or symbol on his or her telephone keypad. Other automated systems and ways to answer prompts of an automated system can be envisioned by one of ordinary skill in the art.

The problem of ineffectively processing a transaction on an automated system can arise, for example, when an ASR system has difficulty understanding the verbalized response of the caller. On the telephone keypad response system, the problem can arise when the caller presses a button that is not an acceptable response. These mistakes require that the caller repeat the input step in order to try to elicit a response that the automated system will understand and accept. Requiring the caller to repeat his or her input takes up extra time of both the caller and the automated system and furthermore may frustrate the caller. To limit the extra use of time of the caller and the automated system, a typical practice is to use a mistake counter which keeps count of the total number of re-promptings. Upon reaching a certain threshold, the caller is transferred to a live operator (called herein an agent). Not only is this practice beneficial to a caller, but it saves time for the company, as after a certain point, the probability of a successful automatic transaction becomes diminishingly small, and thus further re-prompting is usually ineffective. In these systems, the same threshold for number of re-promptings required before the call is transferred is used in all situations.

However, there is a problem with the current mistake counter practice described above. It is common for some callers to have problems when first interacting with the system, but then they become more proficient and are able to complete the remainder of the dialog successfully without error. The mistake counter which does a simple count may result in the forfeit of an opportunity for successful automation. A further consideration is that a caller may be a repeat customer. If so, then the caller's history of successes or failures utilizing the automated system could be helpful in determining if the current call is likely to proceed successfully. For example, if the caller is currently struggling with a step that he or she has previously navigated successfully, transferring the caller too quickly may again result in the forfeit of an opportunity for successful automation.

U.S. Pat. No. 6,411,687 (hereinafter '687) generally involves a method of routing a call received by a call center. The call is first transferred to an automated system where information about the call is elicited from the caller. As the caller gives responses to the questions, a behavioral response device analyzes the caller's response according to predetermined criteria to identify callers having certain behavioral characteristics. When these behavioral characteristics are identified, one of two approaches is taken. One approach is to route the caller to an agent that is best trained for handling that kind of call. A second approach is to alert the standard agent who normally receives incoming calls that there is a caller with special needs on the line. With this pre-warning, the agent could adapt his or her style to match the needs of the caller. However, in this art at all calls are directed to some sort of agent, whether a typical agent or a specialized agent. Thus, the automated system does not reduce the number of callers that must speak to an agent. Rather, the automated system, at most, just sorts the received calls.

U.S. Pat. No. 6,584,180 (hereinafter '180) involves processing a call on an automated system—specifically an ASR system. It involves allowing a caller to complete their call on the ASR system, even when the system encounters difficulty in understanding the caller's response. The ASR receives a voice response from the caller, synthesizes the response, and then sends back the response to the caller for confirmation that the voice input was correctly recognized. If the caller responds negatively to the confirmation message, the ASR system plays the previously received voice input from the caller as audio to an agent serving the role as a screener interface. The screener listens to the audio and enters what he or she thinks is the caller's response. The screener's response is synthesized into a voice response message by the ASR and transmitted to the caller for confirmation. Only if the caller responds negatively to the screener's interpretation of the caller's message is the call switched to an operator for manual handling of the caller's special problem. Otherwise, the caller continues utilizing the ASR system until call completion or until another problem arises. However, in this art, when a problem arises, there is still a need for human interaction at a call center or the like in order to keep a caller on the ASR system. Furthermore, the complete confirmation loop is quite time intensive. Additionally, this art can only be used on an ASR system, but is not applicable to an IVR that utilizes a telephone keypad for caller input.

AT&T has developed and implemented a system called "How may I help you?" (hereinafter "HMIHY") which utilizes natural language understanding (NLU) technology. Instead of a caller listening to a series of voice prompts and determining the appropriate response, the HMIHY system lets a caller respond directly to a question such as, "How may I help you?" The NLU technology enables the system to: (1) understand a caller's response, (2) route a caller to the appropriate personnel, and (3) ask the caller additional questions when more information is needed. However, when the HMIHY system does not understand a given response the system must repeat instructions or try to illicit information in some other way. When reaching a standard threshold value for the number of mistakes, the call is transferred. By using only one threshold value, a caller may be transferred either prematurely or after too long of a delay.

Thus, a problem that emerges from the art is having only a single threshold for measuring when a user is unsuccessful at processing his or her call on an automated system. For example, the system may measure how many mistakes the caller makes—an "inefficiency metric"—and have only one threshold for that metric, i.e., ten mistakes. Accordingly, in this example, all calls will be transferred to a live agent when any caller makes ten mistakes. Having only a single threshold for all situations can make a call center unresponsive to the various needs of different callers. Thus, at least one of two main goals of a call center—maximizing its efficiency and insuring customer satisfaction—will likely not be met.

BRIEF SUMMARY OF THE INVENTION

In accordance with one aspect of the present invention, the problem of call center inefficiency due to a lack of responsiveness to various needs of different callers is solved by having at least two choices of thresholds from which at least one threshold is chosen. This chosen threshold is used as the threshold that determines when a call is routed to a live agent. Having multiple thresholds allows for a more intelligent and dynamic response to a diverse audience of callers and to different needs during the processing of various phases of a call when utilizing an automated system. Such a method for processing calls increases the opportunity for full automation on the automated system. Therefore, the efficiency of the automated system is increased since fewer agents will be needed to process the calls.

In one embodiment, a call is received by a call center or some other type of entity. The call is transferred to an automated system with which a caller processes their transaction. An example of an automated system is an integrated voice response (IVR) system. Common IVR systems are an automatic speech recognition (ASR) system and telephone keypad response system. Some examples of transactions for which a call center may transfer a call to an automated system are when the caller wants to: (1) purchase a product, (2) ask a question, (3) make a change to an account, or (4) addressing a billing issue. During the processing of the call on an automated system, a caller may make a mistake in how he or she responds to the automated system's prompts. The total number of mistakes is tracked and compared to an inefficiency threshold. According to the current invention, an inefficiency threshold is chosen from at least two inefficiency thresholds for a given inefficiency metric. When the sum of mistakes by the caller reaches the selected inefficiency threshold, the call is transferred to an agent. However, as long as the inefficiency threshold is not reached, the caller continues processing the call on the automated system. Another example of an inefficiency metric, besides the number of mistakes a callers makes on the automated system, is an amount of time spent processing a certain phase of the call. By choosing the most appropriate inefficiency threshold for a given inefficiency metric, the efficiency of the automated system coupled with the caller's satisfaction is maximized.

In a further embodiment, the inefficiency threshold is selected based on an inefficiency factor. Some examples of inefficiency factors include: a past history of a caller utilizing this automated system or any automated system; a phase of processing a transaction where a call is divided into at least two phases; or a score corresponding to how close a mistaken response is to an accepted response when using an ASR system.

In a still further embodiment, an inefficiency threshold is selected for each of at least two inefficiency metrics and the call is transferred from the automated system when both of the selected inefficiency thresholds are reached. At least one of the inefficiency thresholds may be selected from at least two inefficiency thresholds.

These and other advantages of the invention will be apparent to those of ordinary skill in the art by reference to the following detailed description and the accompanying drawings.

DETAILED DESCRIPTION

A problem that emerges from the art is that when feedback is measured from a caller using an automated system, only a single inefficiency threshold is used to determine when a caller is having difficulty using the automated system. When this single inefficiency threshold is reached, the call is transferred. Upon transfer of the call, the caller processes their transaction with an agent. Having only a single inefficiency threshold for all situations can lead to any of the following problems: (1) transferring a call too quickly; (2) transferring a call too slowly; and (3) giving a caller the feeling that the call center is unresponsive to his or her needs. Thus, at least one of two main goals of a call center—(1) maximizing the efficient use of the system by the caller, i.e. maximizing the number of calls that are completely processed on the automated system, and (2) assuring customer satisfaction—will likely not be met.

This problem of call center inefficiency due to a lack of responsiveness to various needs of different callers is solved in one aspect of the present invention by having at least two choices of inefficiency thresholds from which one inefficiency threshold is chosen. For a given call or a given phase of a call, when the chosen inefficiency threshold is reached, the call is routed to an agent. Having multiple inefficiency threshold values from which to choose when processing a call with an automated system allows for a more dynamic response to a diverse audience of callers and to different needs of a single caller during the various parts of a call.

Figure 1:
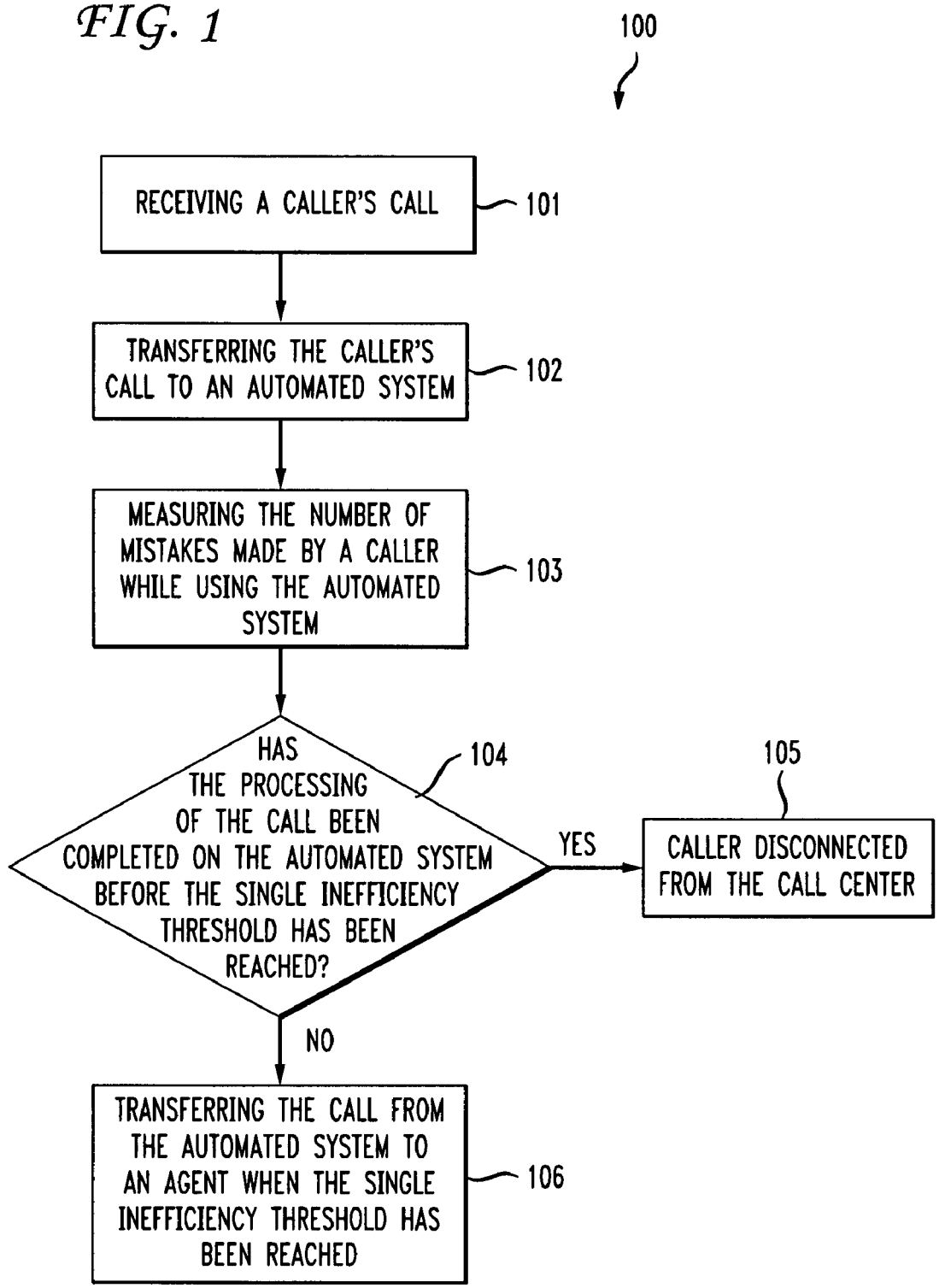
FIG. 1 is a flowchart showing an automated system using a single inefficiency threshold value.

In FIG. 1, at 100, an example of using a single inefficiency threshold to determine when to transfer a call from an automated system is presented. At 101, a caller's call is received. At 102, the caller's call is transferred to an automated system. A common type of automated system in the art is an interactive voice response (IVR) system. Some examples of IVR systems are telephone keypad response systems and automated speech recognition (ASR) systems. A common feature of these automated systems is that once the call is transferred to the automated system, the call can be processed without the need for agent intervention.

At 103, the number of mistaken entries made by a caller while using the automated system is measured. Examples of mistaken entries that could be made on a telephone keypad response system are entering a number on the telephone keypad that does not correspond to a presented option and failure to enter any response. An example of a mistaken entry made on an ASR system is when a caller speaks a response that the system does not recognize.

At 104, it is determined if the processing of the call has been completed on the automated system before the single inefficiency threshold has been reached. If the processing of the call has been completed, then, at 105, the caller disconnects from the call center.

If the caller reaches the single inefficiency threshold before having completed the processing of the call on the automated system, then, at 106, the call is transferred to an agent to complete the processing of the call.

Figure 2:
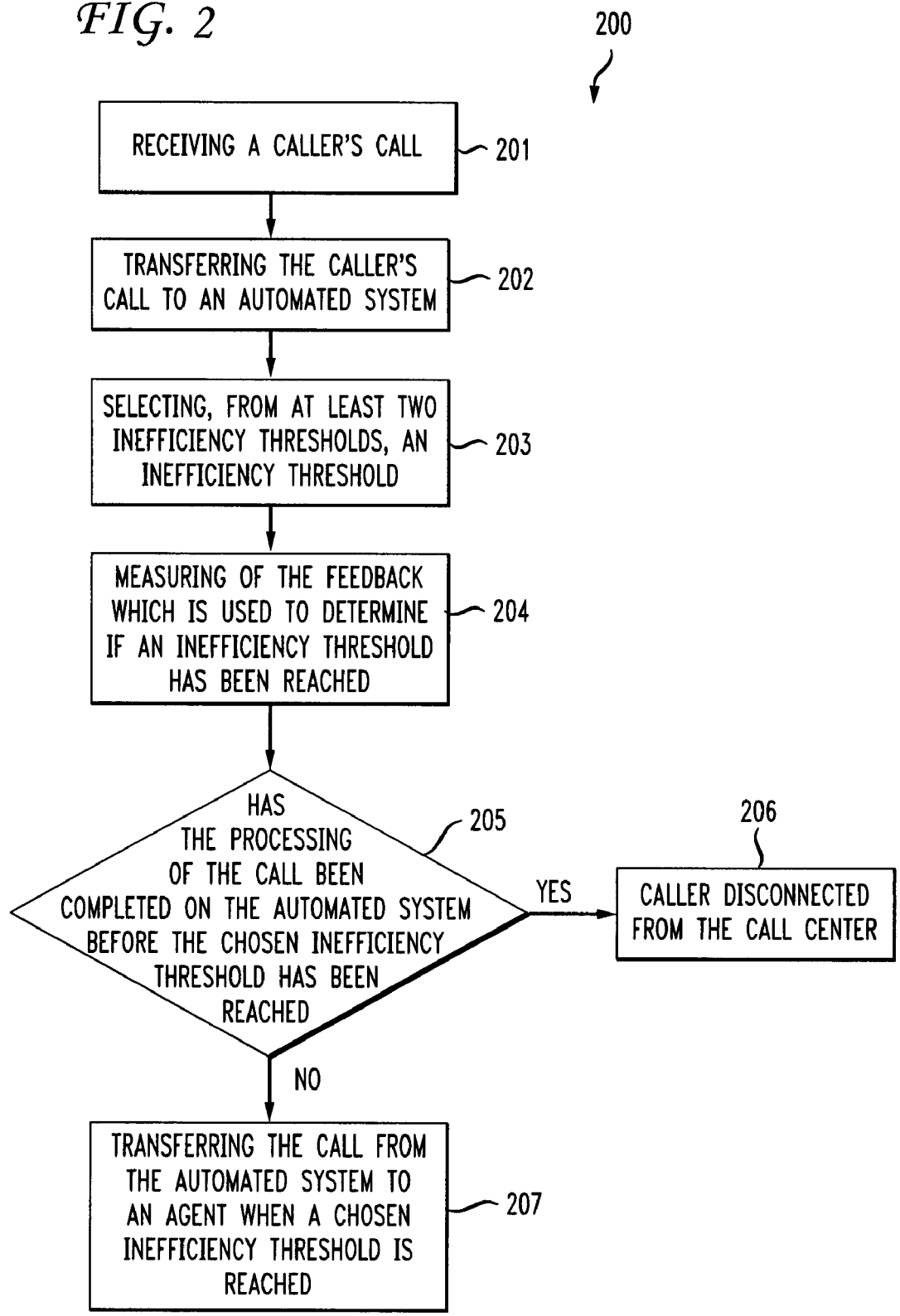
FIG. 2 is a flowchart showing an automated system using multiple inefficiency threshold values.

In FIG. 2, at 200, an embodiment of the current invention featuring an improved overall process for enhancing the efficiency of an automated system is shown. At 201, a caller's call is received, for example, at a call center or a place of business. At 202, a caller's call is transferred to an automated system. Some examples of transactions for which a call center may transfer a call to an automated system are when the caller wants to: (1) purchase a product, (2) ask a question, (3) make a change to an account, or (4) address a billing issue. Other examples can be envisioned by those of ordinary skill in the art.

At 203, one of the differences between the current invention and the art is presented. For a given inefficiency metric, a selection is made from at least two inefficiency thresholds is made at 203. The multiple inefficiency thresholds represent various levels associated with the given inefficiency metric. An inefficiency metric is a measure of inefficiency for a call being processed on an automated system. Some examples of inefficiency metrics that are applicable when a caller is utilizing an automated system include: (1) length of time for processing a total call or a specific phase of the call, (2) number of mistakes during the processing of a total call or a specific phase of the call; and, (3) in an ASR system, how close the callers response is to the response expected by the system. Once an inefficiency metric is selected, inefficiency thresholds within the given inefficiency metric can be identified. The two or more different inefficiency thresholds for the given inefficiency metric may be applied to different calls, i.e. one inefficiency threshold may be used for the entire processing of one call, while another inefficiency threshold may be used for the entire processing of another call. Alternatively, the two or more inefficiency thresholds may be applied within the same call, i.e. one inefficiency threshold is applied to one phase of the call, while another inefficiency threshold is applied to another phase of the call. Other applications of the at least two inefficiency thresholds may be contemplated by those of skill in the art once the invention is known.

In one embodiment of the invention, an inefficiency factor is used to determine which inefficiency threshold to choose for a given call or a given phase of the call. Some examples of inefficiency factors include: (1) a past history of a caller utilizing the automated system, (2) a past history of a caller utilizing any automated system, (3) a phase of processing a transaction such as a first phase of a call versus a middle or last phase of a call, (4) a depth of steps in the processing of a call, and (5) a scoring of a response of a caller utilizing an ASR system. A depth of steps in the processing of a call represents the caller's progress through the layers of the automated system's protocol. A change in a layer means that the caller is processing a qualitatively different phase or step of the transaction than the previous phase or step. A scoring of a response on an ASR represents how close or how far a caller is from saying an accepted response.

The following illustration will further clarify the relationship between an inefficiency factor, an inefficiency metric, and an inefficiency threshold. The inefficiency factor of "a phase of processing a transaction" will be used, and the described call will have two phases, an initiation phase and a completion phase. The given inefficiency metric for this illustration will be "time into the call". The inefficiency thresholds are "units of minutes", which range from one minute to ten minutes. For the initiation phase of the call, the inefficiency threshold chosen is two minutes, meaning that the caller is allowed two minutes to complete the initiation phase of the call. If the caller does not finish the initiation phase within this time limit, the call is transferred to an agent. If the caller does finish the initiation phase within this time limit, the call proceeds to the completion phase, where the caller has five minutes to complete the call. If the caller does not finish the completion phase within this time limit, the call is transferred to an agent. If the caller does finish the completion phase within this time limit, the call is completed.

The method continues at 204 with the measurement of feedback, which is related to the inefficiency metric being monitored, to determine if the selected inefficiency threshold has been reached. In this embodiment, the feedback measurement takes place while the caller is using the automated system.

At 205, it is determined if the processing of the call has been completed on the automated system before the chosen inefficiency threshold has been reached. If the processing of the call has been completed on the automated system, then, at 206, the caller disconnects from the call center.

However, if the chosen inefficiency threshold has been reached before the caller completes the call on the automated system, then, at 207, the call is transferred from the automated system. In one embodiment, the call is transferred to an agent where the call is further processed. In another embodiment, the call is transferred to a message machine or message center where the caller is prompted to leave a message and an agent will call them back sometime later. Other possible destinations for the transferred call can be envisioned by those of ordinary skill in the art.

One of the advantages of having a choice of inefficiency thresholds is that the choice allows for a more customized approach to maximizing the efficiency of an automated system than was previously suggested in the art. Maximizing the efficiency of an automated system means balancing the dual goals of: (1) encouraging as many callers as possible to complete the processing of their transaction by utilizing the automated system, thus avoiding the need for agent intervention, and (2) not delaying too long before a call is transferred to an agent if such delay will result in not properly using customer and network time.

In an alternative embodiment of the invention, an inefficiency threshold is selected for each of at least two inefficiency metrics and the call is transferred from the automated system when both of the selected inefficiency thresholds are reached. At least one of the inefficiency thresholds may be selected from at least two inefficiency thresholds.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of processing a call from a caller on a first automated system wherein processing the call on the automated system comprises a plurality of phases, the method comprising:
   receiving a mistaken response to a prompt from the first automated system;
   identifying a phase of the call from the plurality of phases;
   determining a first inefficiency factor and first inefficiency metric for the phase of the call;
   determining a second inefficiency factor and a second inefficiency metric for the phase of the call;
   selecting a first inefficiency threshold from a plurality of first inefficiency thresholds, where the selection of the first inefficiency threshold is based on a past history of the caller utilizing a second automated system and the first inefficiency factor and the first inefficiency metric for the phase of the call;

selecting a second inefficiency threshold from a plurality of second inefficiency thresholds, where the selection of the second inefficiency threshold is based on how close the mistaken response is to an accepted response and the second inefficiency factor, the second inefficiency metric for the phase of the call and the first inefficiency threshold; and transferring the call to an operator from the first automated system when a level of the first inefficiency metric reaches the selected first inefficiency threshold and a level of the second inefficiency metric reaches the selected second inefficiency threshold.

2. The method of claim 1, wherein the first inefficiency metric is a count of a number of mistakes.

3. The method of claim 1, wherein the first inefficiency metric is a length of time.

4. The method of claim 1, wherein the first inefficiency metric is a time to respond.

5. The methods of claim 1, wherein the first inefficiency factor is the caller's performance in at least one previous call.

6. The method of claim 1 wherein the first inefficiency metric for the phase of the call represents a quantity of time of processing the phase of the call on the first automated system.

7. The method of claim 1 wherein the first inefficiency metric for the phase of the call represents a number of steps on the first automated system.

8. The method of claim 1 wherein the first inefficiency metric for the phase of the call represents a depth of the steps of processing the call on the first automated system.

* * * * *